(12) United States Patent
Choudhury et al.

(10) Patent No.: US 11,188,791 B2
(45) Date of Patent: Nov. 30, 2021

(54) ANONYMIZING DATA FOR PRESERVING PRIVACY DURING USE FOR FEDERATED MACHINE LEARNING

(71) Applicant: INTERNATIONAL BUSINESS MACHINES CORPORATION, Armonk, NY (US)

(72) Inventors: Olivia Choudhury, Cambridge, MA (US); Aris Gkoulalas-Divanis, Waltham, MA (US); Theodoros Salonidis, Wayne, PA (US); Issa Sylla, Boston, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 230 days.

(21) Appl. No.: 16/686,522

(22) Filed: Nov. 18, 2019

(65) Prior Publication Data

US 2021/0150269 A1 May 20, 2021

(51) Int. Cl.
*G06K 9/62* (2006.01)
*G06K 9/68* (2006.01)
(Continued)

(52) U.S. Cl.
CPC ....... *G06K 9/6257* (2013.01); *G06F 21/6254* (2013.01); *G06K 9/6223* (2013.01);
(Continued)

(58) Field of Classification Search
CPC .. G06K 9/6257; G06K 9/6223; G06K 9/6247; G06K 9/6885; G06N 20/00; G06F 21/6254
See application file for complete search history.

(56) References Cited

U.S. PATENT DOCUMENTS 10,216,799 B2   2/2019  Kumar
2017/0343028 A1  4/2017  Chen
(Continued)

OTHER PUBLICATIONS

Anonymous, "Quantifying risk in operationalizing ML models," IP.com; IPCOM000258892D. Published Jun. 22, 2019. 5 pages.
(Continued)

*Primary Examiner* — David F Dunphy
(74) *Attorney, Agent, or Firm* — Cantor Colburn LLP; Joseph Petrokaitis

(57) ABSTRACT

A computer-implemented method for training a global federated learning model using an aggregator server includes training multiple local models at respective local nodes. Each local node selects a set of attributes from its training dataset for training its local model. Each local node generates an anonymized training dataset by using a syntactic anonymization method, and by selecting quasi-identifying attributes from training attributes, and generalizing the quasi-identifying attributes using a syntactic algorithm. Further, each local node computes a syntactic mapping based on equivalence classes produced in the anonymized training dataset. The aggregator server computes a union of mappings received from all the local nodes. Further, federated learning includes training the global federated learning model by iteratively sending, by the local nodes to the aggregator server, parameter updates computed over the local models. The aggregator server aggregates the received parameter updates, and sends the aggregated parameters to the local nodes.

20 Claims, 8 Drawing Sheets

(51) Int. Cl.
  *G06F 21/62* (2013.01)
  *G06N 20/00* (2019.01)

(52) U.S. Cl.
  CPC ......... *G06K 9/6247* (2013.01); *G06K 9/6885* (2013.01); *G06N 20/00* (2019.01)

(56) References Cited

U.S. PATENT DOCUMENTS

| | | | |
|---|---|---|---|
| 2020/0285980 A1* | 9/2020 | Sharad ................... | G06N 20/20 |
| 2020/0358599 A1* | 11/2020 | Baracaldo Angel ........................ | G06F 21/6227 |
| 2021/0073677 A1* | 3/2021 | Peterson ................... | G06N 3/04 |
| 2021/0073678 A1* | 3/2021 | Chu ....................... | G06N 3/084 |
| 2021/0166157 A1* | 6/2021 | Bhowmick ............ | G06N 20/20 |

OTHER PUBLICATIONS

Anonymous, "Reinforcement Learning for Fuzzing Testing Techniques," IP.com; IPCOM000252021D. Published Dec. 13, 2017. 36 pages.

Deyoung et al., "Privacy Preserving Network Security Data Analytics: Architectures and System Design," Proceedings of the 51st Hawaii International Conference on System Sciences, Jan. 3, 2018. 9 pages.

Fioretto et al., "Privacy-Preserving Federated Data Sharing," Proceedings of the 18th International Conference on Autonomous Agents and Multiagent Systems (AAMAS 2019), May 13-17, 2019, pp. 638-646.

Tan et al., "Privacy Preserving Anomaly Detection for Internet of Things Data," ip.com; IPCOM000252511D. Published Jan. 19, 2018. 6 pages.

Truex et al., "AHybrid Approach to Privacy-Preserving Federated Learning," ACM Workshop on Artificial Intelligence and Security, Nov. 15, 2019, London, UK. ACM, New York, NY, USA, 11 pages. https://doi.org/10.1145/1122445.1122456. 11 pages.

\* cited by examiner

FIG. 3

ANONYMIZING DATA FOR PRESERVING PRIVACY DURING USE FOR FEDERATED MACHINE LEARNING

BACKGROUND

The present invention relates generally to computer technology, and more particularly to anonymizing the data used for training a federated machine learning system.

Machine learning techniques include deep learning (also known as deep structured learning or hierarchical learning) methods that may be based on artificial neural networks. Deep learning architectures such as deep neural networks (DNN), deep belief networks, recurrent neural networks (RNN), and convolutional neural networks (CNN) have been and are being used in almost all fields including computer vision, speech recognition, natural language processing, audio recognition, social network filtering, machine translation, bioinformatics, drug design, medical image analysis, material inspection and board game programs. Such machine learning techniques are used to analyze data similar to (or in some cases better than) how a human user would analyze the data. The machine learning techniques first require large volumes of data to be used to train such deep learning machines/architectures to be able to "think" like a human.

SUMMARY

According to one or more embodiments of the present invention, a computer-implemented method for federated learning is described. The method includes training a global federated learning model using an aggregator server and multiple local models corresponding to multiple local nodes respectively. Operations for training the global federated learning model include training the local models at the local nodes. Training a first local model at a first local node includes receiving, by the first local node, a training dataset that includes multiple attributes associated with multiple records. Further, training a first local model includes selecting, by the first local node, a set of attributes from the training dataset, the set of attributes to be used for training the first local model corresponding to said first local node. Further, training a first local model includes generating, by the first local node, an anonymized training dataset by anonymizing the training dataset using a syntactic anonymization method. Syntactic anonymization includes selecting the quasi-identifying attributes among the set of attributes to be used for training the first local model. Syntactic anonymization further includes generalizing the quasi-identifying attributes using a syntactic algorithm. Syntactic anonymization further includes computing a first syntactic mapping based on the equivalence classes produced in the anonymized training dataset. Further, federated learning method includes sending, by the local nodes to the aggregator server, multiple mappings from the respective local nodes, the mappings being computed based on the equivalence classes in the anonymized training dataset from each local node. Further, federated learning method includes computing, by the aggregator server, a union of the multiple mappings received from the local nodes. Further, federated learning method includes iteratively training the global federated learning model. Training the global federated learning model includes training, by the local nodes, the respective local models using corresponding machine learning algorithms with respective anonymized training datasets. Training the global federated learning model further includes sending by the local nodes to the aggregator server, multiple parameter updates computed over the local models from the respective local nodes. Training the global federated learning model further includes computing the global federated learning model by the aggregator server, by aggregating the received multiple parameter updates computed over the local models from the respective local nodes. Training the global federated learning model further includes sending aggregated parameters of the global federated learning model from the aggregator server to the local nodes.

Embodiments of the present invention can include a system, a computer program product, or a machine that implements one or more described operations.

Embodiments of the present invention improve the privacy and security of a federated learning system. Further, embodiments of the present invention improve the accuracy of a trained global machine learning (ML) model compared to federated learning approaches that use existing non-syntactic privacy protocols such as differential privacy. Further, embodiments of the present invention require significantly lower computation and communication cost compared to existing approaches that use cryptographic protocols for privacy-protecting the data. Further yet, technical solutions provided by one or more embodiments of the present invention facilitate compliance with privacy regulations that provide requirements around adequate data de-identification/data anonymization. Also, advantages of embodiments of the present invention include lower infrastructure costs of maintaining the data to participate in federated learning as the anonymized data do not require a secure environment for storage. Data reuse is also possible, which makes the anonymized dataset at each respective local site/node a useful resource for supporting multiple types of analyses, beyond its use in the federated learning. Additionally, embodiments of the present invention reduce the need for strict firewall rules at the various local sites/nodes, thus reducing infrastructure costs further.

Embodiments of the present invention accordingly improves federated learning and enables multiple users (local nodes/sites), which are holding personal and sensitive data, to collaborate in order to collectively build a ML model in a privacy-preserving way, with the global ML model achieving a high prediction accuracy because of the substantial data from the multiple sites that can be used for training the global ML model.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3 depicts example training data in an example scenario according to one or more embodiments of the present invention;

Figure 1:
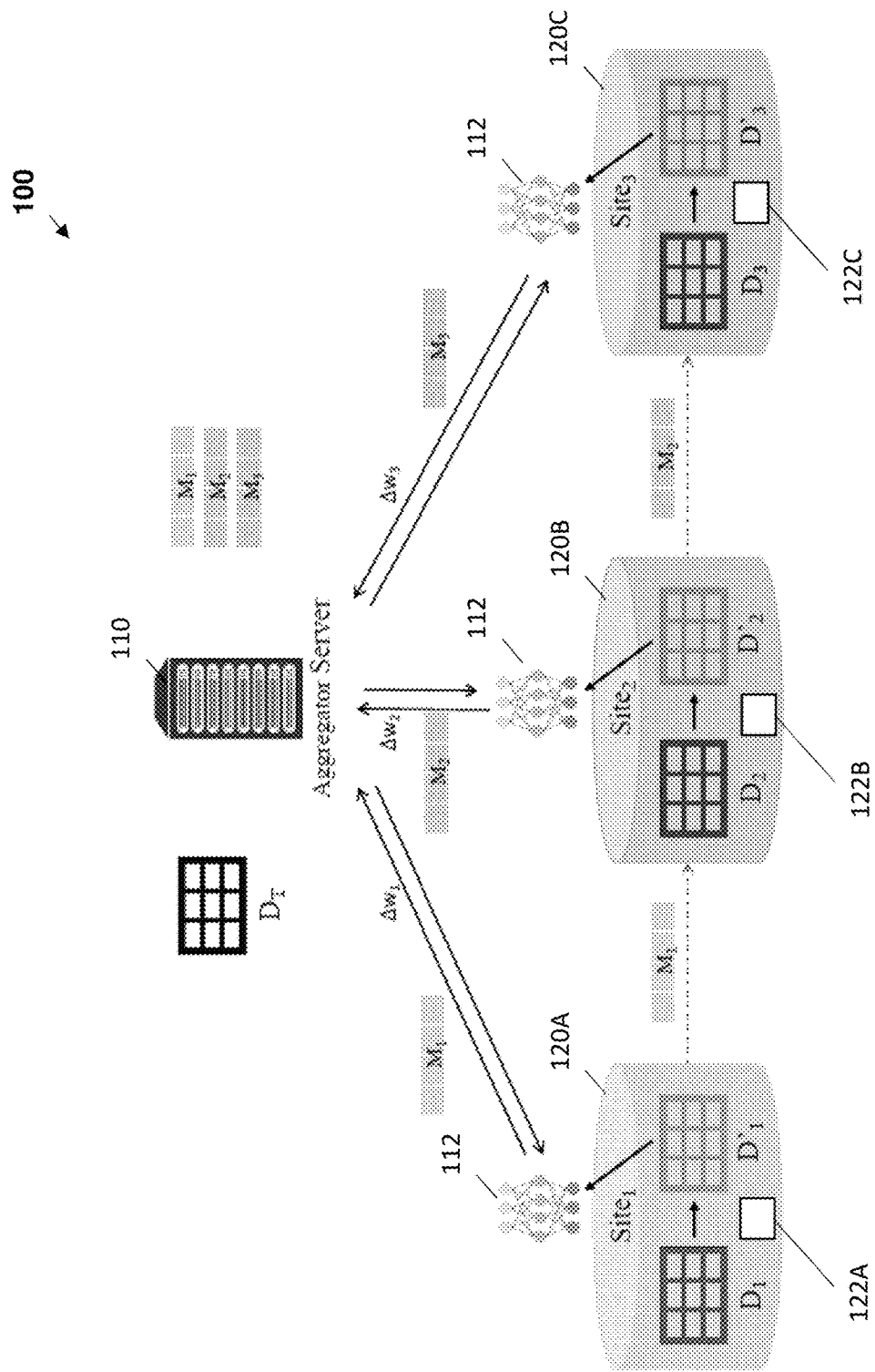
FIG. 1 depicts a federated learning system according to one or more embodiments of the present invention.

The diagrams depicted herein are illustrative. There can be many variations to the diagrams, or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number corresponds to the figure in which its element is first illustrated.

DETAILED DESCRIPTION

Federated learning (FL) is a machine learning technique that facilitates training a global machine learning model from data distributed across multiple sites, without having to move the data. This is achieved through an iterative process of training models locally, transmitting updates of local models' weights to an aggregator server, and updating the global model to be shared with the sites. Federated learning can be used for training any type of machine learning algorithm, for instance deep neural networks (DNN), using the multiple local datasets contained in the multiple sites. The aggregator server and the multiple sites (or "local nodes") exchange parameters (e.g. the weights of a deep neural network) between these local nodes at a predetermined frequency to generate the global machine learning model.

The global machine learning model is trained to perform a prediction analysis. The global machine learning model is used to provide a prediction result for new input data samples. For example, in a health-related application, the global machine learning model is trained to predict a medical diagnosis and/or a medical prescription, when provided with training data about a user's demographic information, history of diagnoses, and other background information. Further, in an e-commerce related application, the global machine learning model may be trained to predict a user's probability of purchasing an item given the user's demographic information and a number of times/instances that the user has visited a particular webpage or used a web-application. It is understood that above are just examples and that in one or more embodiments of the present invention different training data can be used for different tasks of prediction analysis.

It should be noted that federated learning may use a central server as an aggregator to control one or more steps of the federated learning algorithm and to act as a reference clock for the various local nodes in the federated learning system. Alternatively, the local nodes may be trained in a peer-to-peer manner, where a central server does not exist, rather the local nodes may be in communication with each other and coordinate the steps of the federated learning algorithm via such communication(s).

For example, federated learning can be used for generating a machine learning model for analyzing data for health applications. In case of such health applications, a large (100+) number of federated sites may not be available. For example, federated learning in this case relies on data from sites such as hospitals and/or insurance agencies. Further, each site may not, individually, have enough amounts of data for deep learning models to be applicable. Hence, federated learning is used to leverage the data from multiple such sites to construct one or more accurate machine learning models.

A technical challenge with federated learning is maintaining privacy when learning the global ML model, by protecting privacy at a local node in updates that may be shared with the central server and/or other local nodes. Even if raw data is not communicated from the local node, privacy attacks are still possible using the model parameters, for example during gradient exchange. Currently existing privacy-preserving techniques for federated learning are based on differential privacy and secure aggregation protocols. However, differential privacy approaches suffer from low utility (model accuracy) due to the excessive noise that is added to the model parameters to offer privacy and are not compliant with regulatory frameworks such as General Data Protection Regulation (GDPR), Health Insurance Portability and Accountability Act (HIPAA), and the like. Further, the existing secure aggregation protocols are limited to protect the data from untrusted servers, and are limited to specific types of computations. In other words, the aggregated data from the existing protocols can be used to identify particular data that is associated with a subject (user) by manipulating the data using particular computations. Further yet, the existing secure aggregation protocols have high computational overhead due to costly cryptographic operations that are used.

Embodiments of the present invention provide technical solutions to address such technical challenges with privacy-protecting the data when operating federated learning systems. Embodiments of the present invention, accordingly, provide improvements to computing technology, particularly federated learning systems. Also, embodiments of the present invention, accordingly, provide a practical application for privacy-protecting data that is transferred/shared by multiple local nodes for training a federated learning system and generating a global federated machine learning model. Particularly, in the fields such as, healthcare, banking, etc. where personal data may be stored at the local nodes, protecting data privacy is a requirement without which the federated learning systems may not be operable because of various regulations and privacy concerns.

One or more embodiments of the present invention facilitates the use of syntactic approaches for privacy-preserving federated learning. A syntactic approach, as is described in detail herein, removes direct identifiers (DIs), protects potentially linkable quasi-identifiers (QIDs), and leaves non- QID, non-DI values as-is in the data of each local node that are to be used for training the federated ML model. This leads to lesser noise compared to using differential privacy and yields much higher model accuracy compared to the existing techniques. The syntactic approaches described herein are compliant with privacy requirements such as HIPAA, GDPR, etc. Further, the syntactic approaches can be used differently at the various local nodes in the federated learning system. For example, the syntactic approach can be used by the various local nodes for processing different types of data, such as relational data, transaction data, sequential data, etc., depending on the types of data stored at each respective local node. Accordingly, one or more embodiments of the present invention facilitate applying syntactic anonymization to a federated learning system to privacy-protect data being shared among various components of the federated learning system.

The application of a syntactic approach in a FL setting comes with a number of technical challenges, which stem from the need to coordinate anonymization across sites, both during and after FL training. The technical solutions provided by one or more embodiments of the present invention address such technical challenges and facilitate augmenting the FL training procedure with a syntactic anonymization at the local sites. As will be described further, a syntactic anonymization is performed on original data at each local node and the anonymized datasets that are generated are used for training the global FL model. The anonymization operates on data records that may include one or more data types, such as relational/tabular data, transactional data, sequential data, location data, trajectory data, etc. For example, such data may include a relational part and a transactional part, such as patient demographics (relational) and patient diagnoses (transactional), offering protection against adversaries who may have knowledge about individuals that can span these data types. In addition, the technical solutions provided by one or more embodiments of the present invention facilitate a global anonymization mapping process that aids the resulting FL global model in the prediction process using the anonymized data.

FIG. 1 depicts a federated learning system 100 according to one or more embodiments of the present invention. The system 100 includes an aggregator server 110 that is in communication with local nodes 120A, 120B, 120C at respective sites. The aggregator server 110, and the local nodes 120A, 120B, 120C are computing systems. The computing systems at each site can be of the same type or of different types. In one or more embodiments of the present invention, the aggregator server 110 can be considered another site, wherein the local node at that particular site is designated to aggregate data from the one or more local nodes 120A, 120B, 120C. It should be noted that while only three local nodes 120A, 120B, 120C are depicted in the example described herein, in one or more embodiments of the present invention the federated learning system 100 can include a different number of local nodes, for example, 2, 10, 15, and so on.

Each local node 120A, 120B, 120C, has respective local data D1, D2, D3. The local data D1, D2, D3 can be any type of data that is accumulated at the local nodes 120A, 120B, 120C for further analysis. For example, the local data D1, D2, D3 can be healthcare data, banking data, ecommerce transactional data, online transactional data, or any other type of data that can be used for training a machine learning model. It should be appreciated that although the local data D1, D2, D3, at the respective local nodes 120A, 120B, 120C, are all from the same domain, they can be accumulated/collected and stored in different manners. For example, the data may include a single data type (e.g., relational data, transaction data, sequential data, trajectories, etc.). Alternatively, or in addition, the data can include multiple data types (e.g., relational data together with transaction data, or relational data and user trajectories, etc.).

Further, each local node 120A, 120B, 120C, can use different database systems or file systems to store the data. Additionally, each local node 120A, 120B, 120C, can have accumulated different (more, fewer) types of parameters. For example, the local node 120A may have accumulated, as part of the local data D1, data of a first user that includes the first user's name, age, gender, address (including zip code), phone number, medical conditions, medical prescriptions, and medical practitioners associated with the user. The local node 120B may have accumulated, as part of the local data D2, data of a second user that includes the second user's address, age, gender, and medical conditions. As can be seen, in this example, the two datasets have different parameters and the order in which the parameters are stored is also different. There can be additional or other differences in other embodiments.

In one or more examples, the local data D1, D2, D3 is preprocessed so that each data record in the data that is transferred and shared for the federated learning, holds the data corresponding to one unique individual user. Accordingly, the shared data from each site are represented along a number of attributes that may contain some common attributes across all sites as well as additional attributes may exist in the data of each individual site.

It should be appreciated that although the examples described herein use data records associated to individual users, in other embodiments of the present invention, the data can be for other types of widgets. The examples herein use data that may be used in health applications and where inference attacks that can be launched by sites and/or the aggregation server using the personal data used for such purposes.

In one or more embodiments of the present invention, the local data D1, D2, D3 at each site is used for training a local machine learning (ML) model 122A, 122B, 122C, at the respective sites. The local models 122A, 122B, 122C can be generated/trained using a respective machine learning technique (CNN, RNN, combination thereof, etc.) at each local node 120A, 120B, 120C.

For the federated learning, the local data D1, D2, D3, is anonymized to generate the anonymized data D1', D2', D3' respectively, at each of the local nodes 120A, 120B, 120C. The anonymized data D1', D2', D3' are used to train the ML models at the local nodes and share parameter updates with the aggregator server 110 for generating the federated global machine learning model 112 ("federated model"). In addition to the parameter updates computed over anonymized local data, the local nodes 120A, 120B, 120C, share with the aggregator server respective syntactic mappings M1, M2, M3. The syntactic mappings M1, M2, M3, can be shared with the aggregator server 110 directly by each respective local node 120A, 120B, 120C. Alternatively, or in addition, each local node 120A, 120B, 120C, shares the syntactic mapping with other, and one of the local nodes sends all of the syntactic mapping M1, M2, M3, to the aggregator server 110.

When the aggregator server 110 (or site) receives a new dataset DT, the data samples in DT are mapped to an equivalence class prior to using the federated model 112 for predictive analysis. The data samples in DT are mapped to the equivalence class using the shared syntactic mapping M1, M2, M3 from each local node.

Each site decides on potentially linkable quasi-identifiers for its dataset and individually anonymizes its own local data D1, D2, D3. To decide on the quasi-identifiers, each local site may consider those attributes of the local dataset that can be found in externally available datasets, thereby forming background knowledge of attackers used to breach privacy. Among such potentially linkable attributes, each site may decide on which attributes to keep in the dataset and anonymize them, instead of removing them from the data, based on the discriminative power of these attributes, essentially how important these attributes are for accurate predictive analysis. The anonymization of the local data leads to a number of equivalence classes produced in the anonymous datasets D1', D2', D3'. An "equivalence class", as used here, is a unique combination of values for the kept quasi-identifying attributes in the local data D1, D2, D3, with each equivalence class containing at least k records (anonymity parameter). The set of equivalence classes produced at a site i (e.g. local node 120A) may be completely different (or may partially overlap) with that produced at another site j (e.g. local node 120B). The set of equivalence classes at the site i is referred to as a "mapping" $M_i$. Because the federated model 112 is produced based on the local models 122A, 122B, 122C, which are trained on anonymous data records, the federated model 112 recognizes input data records that are at the same level of granularity as those seen in the training data, and thus, at the level of an equivalence class among those of the union of mappings $M_i$ produced at each of the local sites i. The set of all mappings $M_i$ is $M=U_iM_i$. This set M has to be known to each site that will be using the federated model 112 for predictions, in order to enable it to encode the test data records to an acceptable granularity known to the global FL model. In one or more examples, the aggregator server 110 performs the predictive analysis for the data DT.

It should be noted that the computation of set M from the various $M_i$'s does not jeopardize privacy. The reason is that each equivalence class corresponds to at least k unique records in the local data D1, D2, D3, of the corresponding local node 120A, 120B, 120C. The parameter "k" can be referred to as an anonymity parameter or threshold, and have a predetermined minimum value in one or more embodiments of the present invention. Its value is selected by the data owner at each local site based on a number of factors, including the sensitivity of the data. The probability of re-identification of an individual by knowing the equivalence class where he or she belongs, is bounded by 1/k, where k is set to at least the predetermined minimum value, (or a predetermined value) which is an acceptable value for privacy. This holds for each and every equivalence class, where given a mapping $M_i$ an individual (corresponding to a data record in D1, D2, or D3) must uniquely participate to one and only one equivalence class in $M_i$. This facilitates the anonymization and yet use of the data for federated learning.

Figure 2:
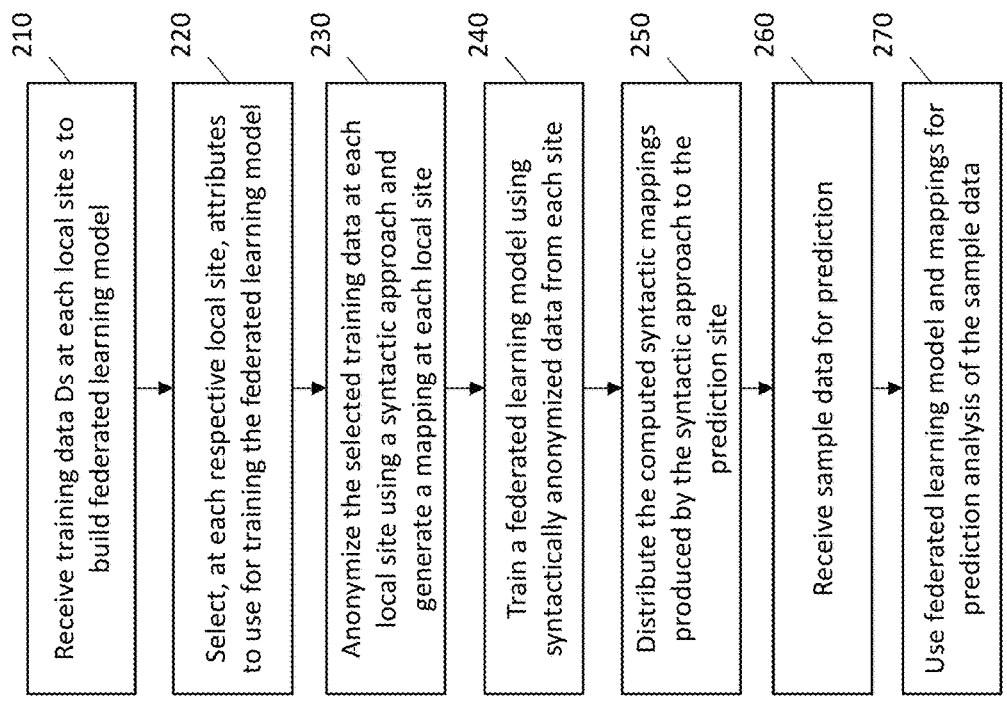
FIG. 2 depicts a flowchart of a method for training the federated model using anonymized data from multiple local sites according to one or more embodiments of the present invention.

FIG. 2 depicts a flowchart of a method 200 for training the federated model 112 using anonymized data from multiple local sites according to one or more embodiments of the present invention. The method 200 includes receiving training data (D1, D2, D3) at each local site s (120A, 120B, 120C) to build the federated learning model 112, at block 210. As noted earlier the training data may include a single data type (e.g., relational data, transaction data, sequential data, trajectories, etc.) or multiple data types (e.g., relational data together with transaction data, or relational data and user trajectories, etc.). In one or more embodiments of the present invention, the method 200 includes preprocessing of the received training data so that each data record holds all the data corresponding to one unique individual data-subject. For example, the data-subject can be a person, a widget, or any other item for which attributes are being accumulated in the training data.

Figure 3:
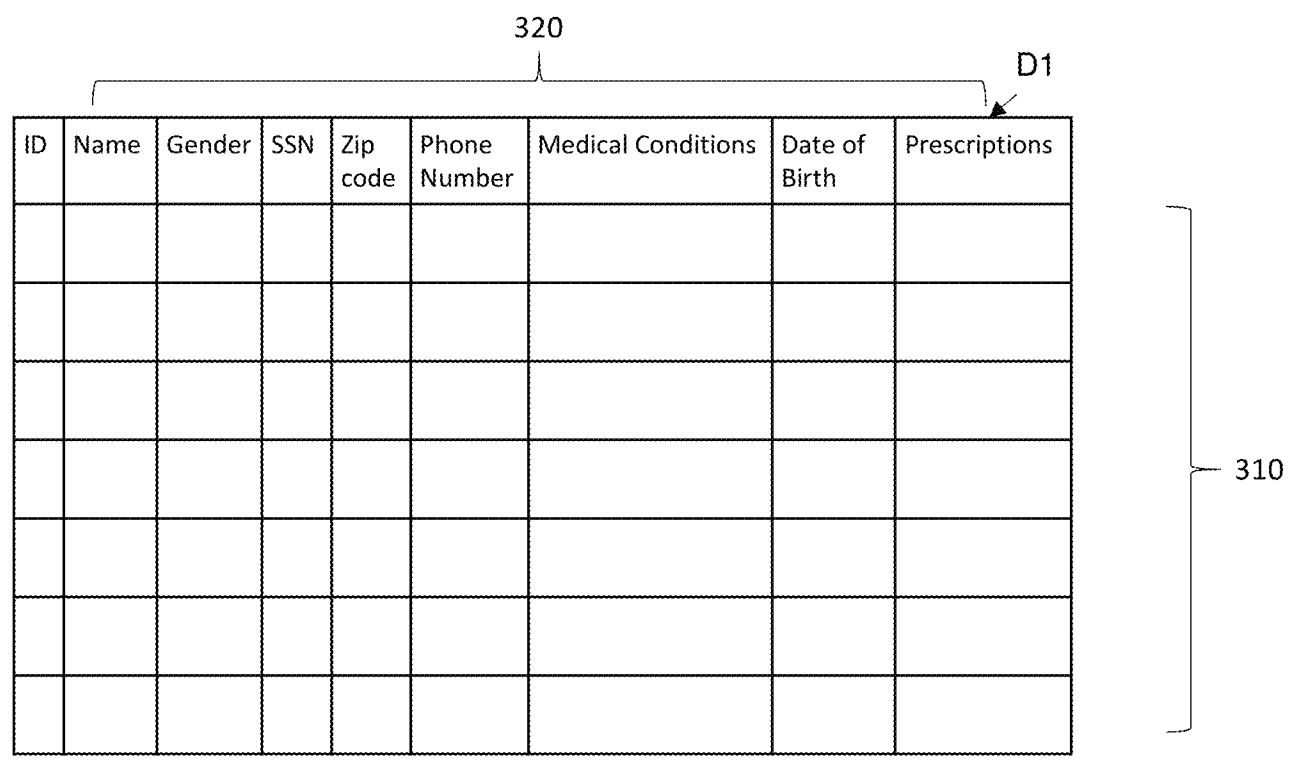

FIG. 3 depicts example training data D1 according to one or more embodiments of the present invention. It is understood that while D1 from the local node 120A is shown, in other embodiments, training data from any other local node can be depicted in the similar manner. Further, it is understood that the depicted training data D1 is just one example, and that in other embodiments of the present invention, D1 can include different type of data. In the depicted example, each record 310 in D1 includes data for an individual person. Each data record 310 describes multiple attributes 320 of the individual person. As noted earlier, the training data D1, D2, and D3 at each site are represented along several attributes 320 that may contain some common attributes across all sites, as well as attributes may exist in the data of each individual site.

Referring back to the flowchart in FIG. 2, the method 200 further includes selecting, at each local site, which attributes from the respective local training data (D1, D2, D3) to use to train the federated learning model 112, at block 220. The attributes that are selected at the local node 120A can be different from the attributes that are selected at the local node 120B, in one or more embodiments of the present invention. Some attributes 320 that are part of local training data D1 may be considered as QIDs (e.g., gender, date-of-birth, zip code, etc.) which, however, may have low discriminative power for the classifier. That is, such attributes 320 from a record 310 by themselves, taken independently may not facilitate identifying the person associated with the record 310. However, when knowing the values of the attributes 320 together, an attacker can facilitate identifying the person. This is because the combination of values of the QIDs can be unique for individuals (for example, the combination of QIDs date-of-birth, gender, and 5-digit zip code has been found to be unique for a very large percentage of US citizens). Including any of these QID attributes 320 in the training of the federated model 112 requires processing that attribute 320 as part of a QID. Processing a QID attribute 320 facilitates generalizing, suppressing, or (generally) perturbing the values of that QID attribute 320, potentially together with values of the other attributes 320 in the QID (combination of the QID attributes 320) in order to satisfy the anonymity requirement. For example, generalization reduces the accuracy of the value of a QID attribute that is used for training a federated ML model. Accordingly, as part of privacy-protecting the training data D1 before using it to train the federated model 112, the method 200 includes enabling the local nodes to decide on which attributes 320 to use to create and train the federated model 112.

Selecting the attributes 320 to be used for training the FL model, or in other words filtering the attributes 320, includes finding the discriminative features that are represented by one or more of the attributes 320 in the training data D1. In one or more embodiments of the present invention, the attributes 320 that are classified as DIs and those classified as QIDs are identified using state-of-the-art algorithms for attribute classification or using a manual process. DIs are not used as part of learning the FL model; these attributes can be removed from the dataset, or be masked, or otherwise perturbed so that they are no longer a threat to individuals' privacy. DIs include attributes such as IDs (e.g., national ID, medical ID, etc.), name, social security number, phone number, address, vehicular registration number, etc. For example, in the D1 shown in FIG. 3, the attributes such as name and SSN, can be characterized as DIs. Such direct identifiers are filtered out of D1. For the QIDs, a process may be followed to select those QIDs that should participate to the training of the FL model. This process may, for example, rank QID attributes in terms of importance for the classification task.

In one or more embodiments of the present invention, each site independently determines which attributes to use (or filter) for training its local model. That is, the local node 120A determines which attributes 320 to use from D1 to train the local model 122A, the local node 120B determines which attributes 320 to use from D2 to train the local model 122B, and the local node 120C determines which attributes 320 to use from D3 to train the local model 122C. Alternatively, or in addition, the local nodes 120A, 120B, 120C can mutually determine on a common set of attributes 320 to use across all sites for training the respective local models 122A, 122B, 122C. For example, a user/administrator from the first local node 120 can share the attributes 320 selected to be filtered (or used) from D1 with a user/administrator from the second local node 120B and the third local node 120C. The administrators can further mutually share their respective selections of attributes 320 for filtering (training). Accordingly, direct identifiers and QIDs are identified from the attributes of the training data at each site.

Certain attributes, such as gender, date-of-birth, and zip code, of the local data qualify as QIDs which, however, may have low discriminative power for the classifier. Processing an attribute as part of a QID and generalizing, suppressing, or perturbing, its original data values along with values of other attributes in the QID can introduce noise to the data and in turn can deteriorate the performance of the model. Hence, in the method 200 each site has to determine the QID attributes that are to be used for training the local model 122A, 122B, 122C. Specifically, the QID attributes are ranked based on feature importance to find the top discriminative ones and discard all others from the training of the local models 122A, 122B, 122C. For example, algorithms such as Recursive Feature Elimination (RFE), ExtraTreeClassifier and Random Forest techniques (RF) can be used for computing feature importance at each site.

Further, the method 200 includes anonymizing the training data (D1, D2, D3) at each local site using a syntactic approach to generate anonymized datasets D1', D2', D3' at the local sites, at block 230. The data that is anonymized includes the attributes 320 that are selected for the training, or in other words, the data that is anonymized excludes the filtered parameters, such as the direct identifiers. The anonymization includes processing the QIDs that are identified in the training data in order to be anonymized based on the requirements of the syntactic privacy model that is used.

In one or more examples, the data anonymization uses a k-anonymity algorithm, which requires each record 310 in the data D1 to be indistinguishable from at least k-1 other records 310, with respect to a set QIDs. The k-anonymity algorithm is selected if the QIDs are relational-only data. "Relational-only" data includes numerical and categorical attributes 320.

Alternatively, a $(k, k^m)$-anonymization algorithm is used if the QIDs include relational and transactional (set-valued) attributes 320. An anonymized version of such relational and transactional datasets should have minimal information loss in relational and transactional attributes, and hence, the $(k, k^m)$-anonymization algorithm enforces k-anonymity on the relational attributes and $k^m$-anonymity on the transactional attributes. The $(k, k^m)$-anonymization algorithm offers privacy with bounded information loss ($\delta$) in one attribute type and minimal information loss in the other.

Figure 4:
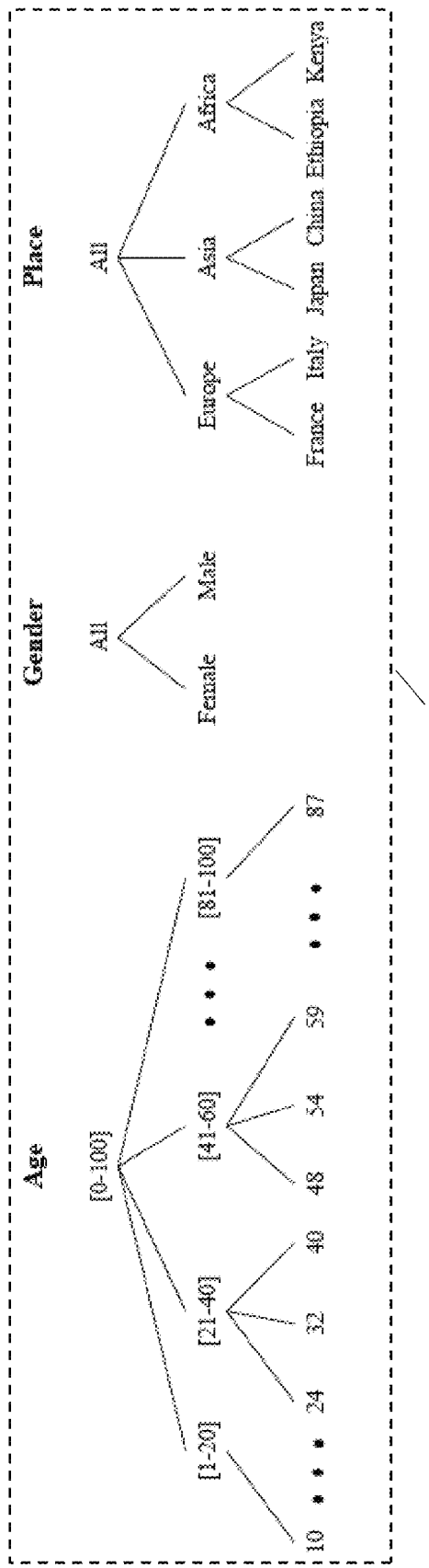
FIG. 4 depicts an example implementation of a (k, k''')-anonymization algorithm on example data according to one or more embodiments of the present invention.

FIG. 4 depicts an example implementation of the $(k, k^m)$-anonymization algorithm on example data according to one or more embodiments of the present invention. Here, D1 is depicted as including relational-transactional attributes. Here, age, gender, and place are relational attributes, while diagnoses codes is a transactional attribute. The diagnoses code can represent medical conditions associated with a person, the diagnoses codes being a notification such as in a health insurance database. The anonymization using the $(k, k^m)$-anonymity algorithm generates the D1' as depicted with k=2, and m=3. Parameter m defines the maximum number of items of the transactional attribute that an attacker may know about an individual (for example, m=3 in D1 means that an attacker may have knowledge of up to 3 diagnoses associated with a patient). Here, the anonymization is generated by generalizing the data records in D1 using the domain generalization hierarchies 410 that is depicted.

As can be seen, the anonymization is performed by replacing a value in the records 310 with a range of values that includes the value (along with other values). The value, and in turn the range of values is expanded until a number of records that contain that range of values is sufficiently large, e.g. at least a predetermined number (k) of records.

Anonymizing the data D1 accordingly includes computing an anonymized counterpart of the data values in the records 310 of D1. This can include, after using the k-anonymity, and/or the $(k, k^m)$-anonymity algorithms, generating a counterpart of the data values using algorithms like clustering-based approaches (e.g., bottom-up recording, top-down specialization, etc.), partitioning methods (e.g., Mondrian), or a combination thereof.

Accordingly, anonymizing the training data includes selecting an appropriate syntactic approach for anonymizing the training data at each site. This selection is done based on the types of attributes that exist in the respective dataset D1, D2, D3 that is to be anonymized. For example, the dataset D1 in FIG. 4 contains both relational and transactional attributes, and hence a $(k, k^m)$-anonymity algorithm was used in that case. If the data includes other types of attributes, different anonymization algorithms are used.

In general, consider that the federated learning system 100 includes N sites, each hosting its own local data Di, where i ∈ N. Let $u_R(\ )$ and $u_T(\ )$ be the functions measuring data utility for relational and transactional attributes, respectively. A lower value of these utility metrics implies less information loss, hence better data utility. Further, let $\delta$ be an upper bound of acceptable information loss in the relational data to accommodate for higher utility in the anonymization of the transaction data. Essentially, $\delta$ sets a balance between the conflicting goals of minimizing information loss in the relational data and minimizing information loss in the transactional data.

Accordingly, for a given dataset D1, the local node 120A generates the corresponding anonymized version D' using $(k, k^m)$-anonymization algorithm to upper-bound the information loss in relational attributes and minimize the information loss in transactional attributes.

Figure 5:
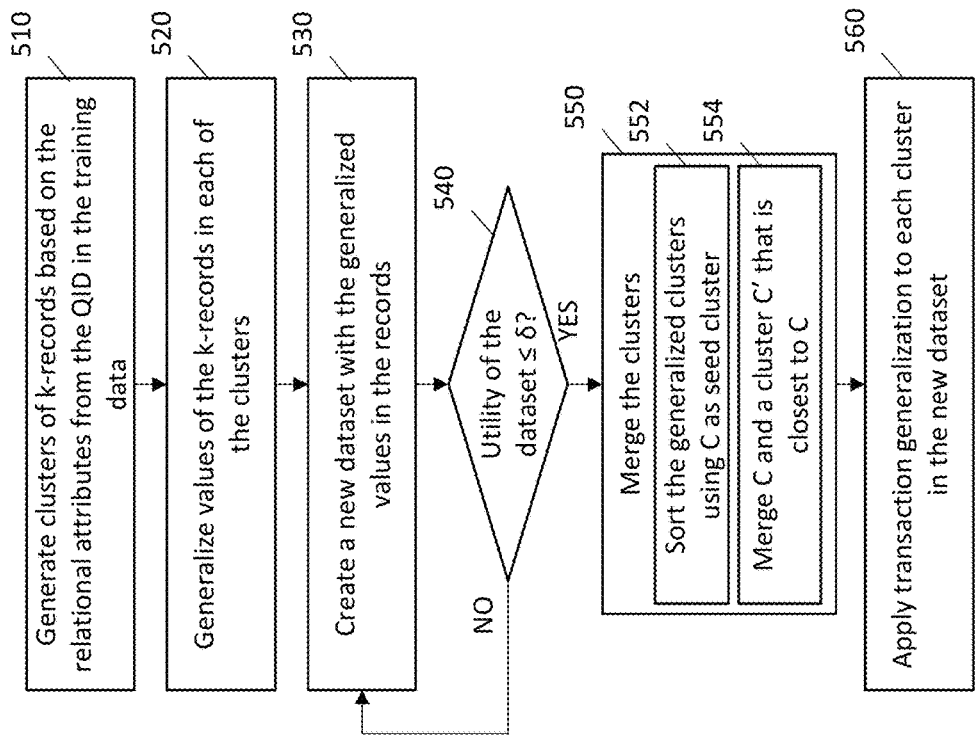
FIG. 5 depicts a flowchart for generating anonymized data for a training data according to one or more embodiments of the present invention.

FIG. 5 depicts a flowchart of a method 500 for generating anonymized data D1' for a training data D1 according to one or more embodiments of the present invention. The method 500 depicts particular example of using $(k, k^m)$-anonymization for a training data D1 that includes relational transactional type. The method 500 includes generating clusters of the relational attributes, at block 510. Specifically, k-anonymous clusters (C1, C2, . . . Cn) are created with respect to relational attributes only, which incur low information loss. Creating a cluster includes computing data record similarity to locate the at least k most similar records with respect to the relational part only, and creating a cluster for these records. Here, k is a predetermined value.

The method further includes generalizing the values of the k records in each cluster, at block 520. Generalizing the values can include creating a range that uses a minimum value from the k records and a maximum value from the k records, or an aggregate value computed over this range, such as the average. Alternatively, the generalization can be based on a domain-specific hierarchy. Once the clusters are generated, a dataset D1' is created to contain the records from the clusters. If the utility metric $u_R(\ )\leq \delta$, the generated clusters are merged as shown at blocks 530 and 540.

The set of clusters in the dataset D1' is merged, such that it is (k, k''')-anonymized with minimal $u_T$ and without violating $\delta$. To achieve this, a cluster C is selected as seed, from the list of generated clusters. The cluster that is selected has minimum $u_R(C)$. Further, the method 500 includes creating two orderings to sort the generalized merged clusters in ascending order of $u_R$ and $u_T$, at block 552. Further, a cluster C' that is closest to C with respect to the two orderings is selected and merged with C, which results in a dataset with $u_R$ satisfying the $\delta$, at block 554. The merged cluster is assigned to D1'.

Further, transaction generalization is applied to each cluster in D1' to create the corresponding (k, k''')-anonymized version D1, at block 560. This method enforces the (k, k''')-anonymization model to training data D1.

It should be noted that while the (k, k''')-anonymization is used in the example described herein, in one or more embodiments of the present invention, other syntactic anonymization algorithms can be used depending on the type of data in the training data. Further, each local node 120A, 120B, 120C can use distinct anonymization algorithms depending on the data types in respective training datasets D1, D2, D3.

The anonymized datasets D1', D2', D3' are used for training the local models 122A, 122B, 122C, at each local node 120A, 120B, 120C, respectively. The training can be any type of machine learning, for example, supervised learning, unsupervised learning, semi-supervised learning, reinforcement learning, etc.

The updates to the parameters computed from the local models 122A, 122B, 122C are sent to the aggregator server 110 for training the federated model 112, at block 240. Using existing federated learning protocols, the global federated learning model 112 is trained. The training in this case is performed using the syntactically anonymized datasets D1', D2', D3' instead of the original data D1, D2, D3. The aggregator server 110 trains the federated learning model 112 based on information (updates to the local models' parameters) computed over the anonymized local datasets, after which the parameter updates are incorporated into the federated learning model 112. This iterative process continues until the global federated learning model converges.

In one or more embodiments of the present invention, the aggregator server 110 shares the global model with the local sites, each hosting its anonymized data D1', D2', D3', for further use in supporting predictive analysis.

Given that all local models 122A, 122B, 122C, are trained using anonymous data records (for example, records generalized on their QID attributes to meet the syntactic privacy algorithm), the knowledge in the federated model 112 is represented at the same aggregate level. Moreover, given that each site may have produced different generalizations of the QID attributes to anonymize its data, the knowledge of the global federated model 112 spans all such data generalizations from across the multiple local nodes 120A, 120B, 120C. For example, different generalizations can be introduced at the different sites due to the differences in the data distribution and number of records, or the value of k used in case of a k, or (k, k''')-anonymization algorithm, etc.

To facilitate the federated model 112 to be used despite such different generalizations, the method 200 further includes distributing the computed syntactic mappings to a prediction site from each local node 120A, 120B, 120C, at block 250. The mappings are produced by the syntactic algorithms at each local node 120A, 120B, 120C when anonymizing the local training data D1, D2, D3. Let M1 be the collection of all different combinations of values for the QID attributes ("equivalence classes") that appear in the anonymized dataset D1' at the local node 120A. Examples of an equivalence class can be seen in FIG. 4: Age: [21-40], Gender: ALL, Place: Europe, Diagnoses: A, B, (C, D, E, F). Each local node 120A, 120B, 120C, has corresponding mappings M1, M2, M3 (see FIG. 1).

The mappings are distributed to the prediction site in one or more ways. In one or more embodiments of the present invention, each local node 120A, 120B, 120C sends its respective mapping M1, M2, M3 to the aggregator server 110. The aggregator server 110 is the prediction site. Alternatively, or in addition, the aggregator server 110 further sends a union of the mappings M1, M2, M3, to the local node 120A, 120B, 120C that is the prediction site. Alternatively, in one or more embodiments of the present invention a first local node 120A sends its mapping M1 to a second local node 120B. The second local node 120B computes a union of M1 and M2, which is the mapping at the second local node 120B. The second local node 120B further sends the computed union to a third local node 120C, for another union computation using the local mapping M3, and so on. The union of all the mappings can then be sent to the aggregator server 110 and the prediction site (if it is different from the aggregator server 110).

Let mapping M be the union of all mappings $M_i$ from the local nodes 120A, 120B, 120C. The federated model 112 is able to process new data records after these are represented under one of the equivalence classes in mapping M. Therefore, the prediction site that will use the federal model 112 to perform prediction analysis will need to have knowledge of M. Accordingly, as described herein, once each local dataset Di is anonymized to Di', where $i \in N$, we share the syntactic mapping ($M_i$), computed at site i, with the aggregator server 110 for subsequent use. Similarly, the mapping information can also be shared across the local nodes 120A, 120B, 120C, through a secure protocol (see dotted lines in FIG. 1). It should be noted that sharing the mapping of a node does not violate privacy because for each equivalence class (by construction) there exist at least k unique records (individuals) with the same values of the QIDs. No records are shared among equivalence classes.

The prediction site receives the sample data as part of a request to initiate prediction analysis, at block 260. The prediction site uses the federated learning model 112 and the mapping M to perform the prediction analysis, at block 270. The result of the prediction analysis is then provided in response to the received request. In one or more examples, the results can be provided via a user interface. Alternatively, or in addition, the results can be provided to a remote computer via a network communication, or any other type of communication.

The data samples that are received as part of the request are in the form of the original data, while the federated learning model has been trained on anonymized data. Hence, the data sample is mapped to an appropriate equivalence class from M, based on the previously-stored list of produced syntactic mappings $M_i$. Let us consider the j-th test sample $D^T$ and the i-th data distribution of equivalence class Ei defined by its mean $\mu_i$ and covariance matrix $\Sigma_i$. In one embodiment of the present invention, the prediction site computes a score $d_M$, based on Mahalanobis distance that is given by:

$$dM(D_j^T, \mu_i, \Sigma_i) = \sqrt{(D_j^T - \mu_i)^T \Sigma_i^{-1} (D_j^T - \mu_i)}.$$

In one embodiment of the present invention, the prediction site selects the equivalence class $E_i^*$ with minimum distance by solving the optimization problem $$i^* = \underset{i}{\operatorname{argmin}} d_M\left(D_j^T, \mu_i, \sum_i\right).$$

The syntactic mapping rule of the selected equivalence class $E_i^*$ is applied to the QIDs of the data sample to create an elevated ("anonymized") version of the data sample which is subsequently input to the federated model 112 for prediction.

For example, for a given data sample, the list of equivalence classes E (from M) are selected to which the data sample can map to. These are equivalence classes whose generalization of each QID attribute is valid for the data sample. For example, if the data sample has T: age=20, gender=Male, then E1={[10-25], M}, and E2={[15,20], All} are acceptable for this data sample, but E3={[25-30], M} is not. If there exist multiple such equivalence classes, the prediction site determines the best fit.

In one or more embodiments of the present invention, to determine the best fit, the prediction site scores each equivalence class E based on its specificity. The specificity can be computed using any of the known metrics for measuring information loss in data anonymization, such as the Normalized Certainty Penalty (NCP).

For numerical attributes without a hierarchy, the range (max-min) can be used as a penalty. For example, E2 is a better fit for record T than E1, since it introduces less uncertainty. For numerical attributes associated with a hierarchy as well as for categorical values associated with a hierarchy, the number of nodes in the subtree rooted at the node containing the value in T, is used as a penalty value. The more the nodes in the subtree, the higher the uncertainty, thus the higher the penalty. For example, E1 is a better fit for record T compared to E2 with respect to the Gender attribute. The overall similarity score of a record T is computed to each equivalence class E, using Global Certainty Penalty (GCP) or a similar metric, by computing Sim (T, E) as a sum, or a weighted sum over all NCP scores, produced as explained before.

The method for performing the federated learning using datasets that are anonymized using syntactic algorithms can be also represented as shown in Table 1.

TABLE 1

Input: Local data $\mathcal{D}_i$ threshold δ, privacy paramers k, m
Function syntacticFL ($\mathcal{D}_i$, δ, k, ):
| foreach $\mathcal{D}_i \in \mathcal{D}$ do
|| $\tilde{\mathcal{D}}_i$ = getDiscriminativeAttributes($\tilde{\mathcal{D}}_i$)

TABLE 1-continued

Figure 6:
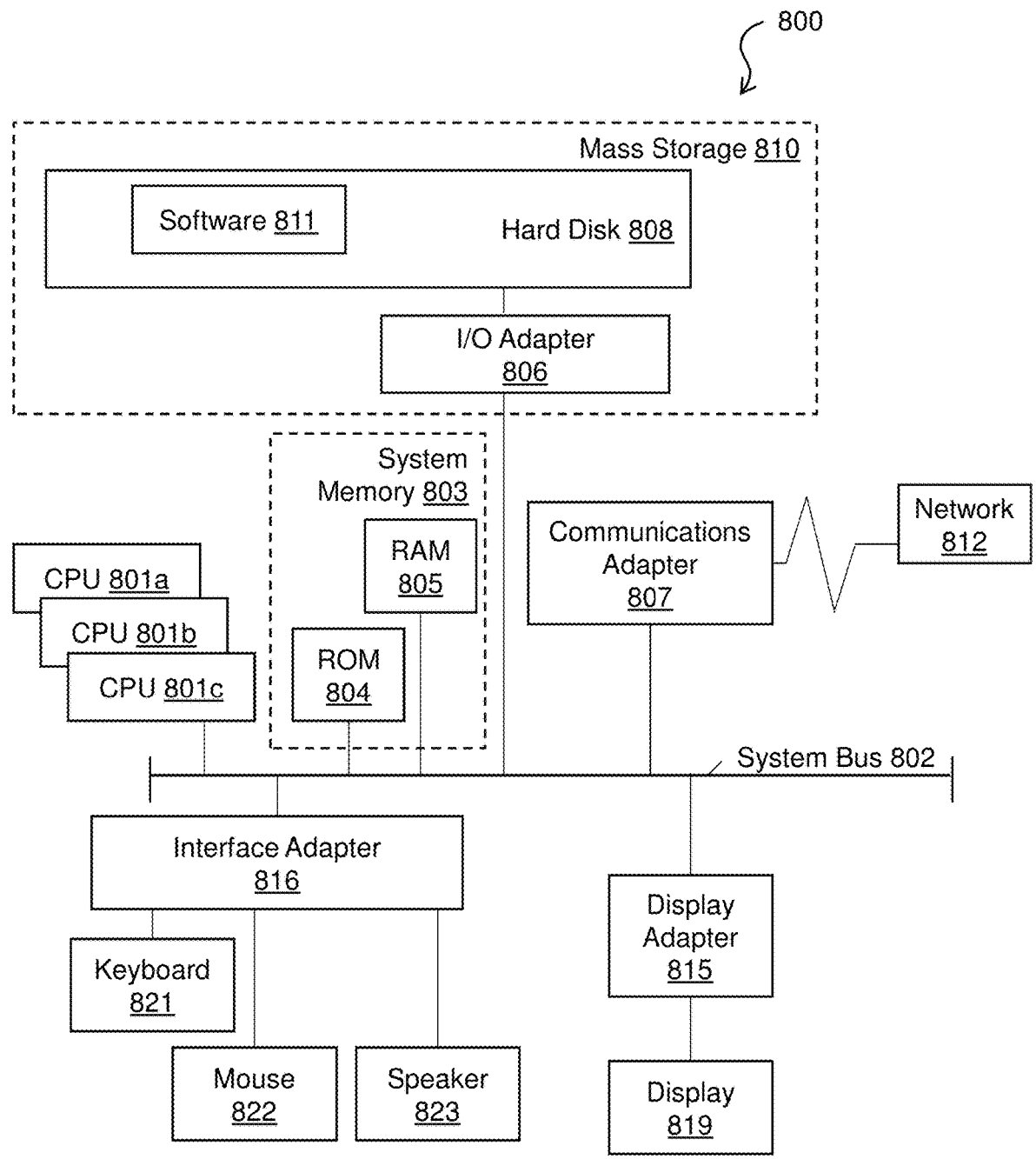
FIG. 6 depicts a computer system according to one or more embodiments of the present invention.

|| $\mathcal{D}_i$ syntacticAnonymization($\tilde{\mathcal{D}}_i$, k, m, δ)
|| $M_i$ = getSyntacticMapping($\mathcal{D}_i$, k, m, δ)
|| shareSyntacticMapping($M_i$)
|| trainFederatedModel($\mathcal{D}_i$)
| end
| foreach $v_j^t \in \mathcal{D}^T$ do
|| $E_i^*$ = getOptimalEquivalenceClass($v_j^t$)
|| $v_j^{t'}$ = mapOptimalEquivalenceClass($v_j^t$, $E_i^*$)
|| testFederatedModel($v_j^{t'}$)
| end Turning now to FIG. 6, a computer system 800 is generally shown in accordance with an embodiment. The computer system 800 can be an electronic, computer framework comprising and/or employing any number and combination of computing devices and networks utilizing various communication technologies, as described herein. The computer system 800 can be easily scalable, extensible, and modular, with the ability to change to different services or reconfigure some features independently of others. The computer system 800 may be, for example, a server, desktop computer, laptop computer, tablet computer, or smartphone. In some examples, computer system 800 may be a cloud computing node. Computer system 800 may be described in the general context of computer system executable instructions, such as program modules, being executed by a computer system. Generally, program modules may include routines, programs, objects, components, logic, data structures, and so on that perform particular tasks or implement particular abstract data types. Computer system 800 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 800 has one or more central processing units (CPU(s)) 801a, 801b, 801c, etc. (collectively or generically referred to as processor(s) 801). The processors 801 can be a single-core processor, multi-core processor, computing cluster, or any number of other configurations. The processors 801, also referred to as processing circuits, are coupled via a system bus 802 to a system memory 803 and various other components. The system memory 803 can include a read only memory (ROM) 804 and a random access memory (RAM) 805. The ROM 804 is coupled to the system bus 802 and may include a basic input/output system (BIOS), which controls certain basic functions of the computer system 800. The RAM is read-write memory coupled to the system bus 802 for use by the processors 801. The system memory 803 provides temporary memory space for operations of said instructions during operation. The system memory 803 can include random access memory (RAM), read only memory, flash memory, or any other suitable memory systems.

The computer system 800 comprises an input/output (I/O) adapter 806 and a communications adapter 807 coupled to the system bus 802. The I/O adapter 806 may be a small computer system interface (SCSI) adapter that communicates with a hard disk 808 and/or any other similar component. The I/O adapter 806 and the hard disk 808 are collectively referred to herein as a mass storage 810.

Software 811 for execution on the computer system 800 may be stored in the mass storage 810. The mass storage 810 is an example of a tangible storage medium readable by the processors 801, where the software 811 is stored as instructions for execution by the processors 801 to cause the computer system 800 to operate, such as is described herein below with respect to the various Figures. Examples of computer program product and the execution of such instruction is discussed herein in more detail. The communications adapter 807 interconnects the system bus 802 with a network 812, which may be an outside network, enabling the computer system 800 to communicate with other such systems. In one embodiment, a portion of the system memory 803 and the mass storage 810 collectively store an operating system, which may be any appropriate operating system, such as the z/OS or AIX operating system from IBM Corporation, to coordinate the functions of the various components shown in FIG. 6.

Additional input/output devices are shown as connected to the system bus 802 via a display adapter 815 and an interface adapter 816 and. In one embodiment, the adapters 806, 807, 815, and 816 may be connected to one or more I/O buses that are connected to the system bus 802 via an intermediate bus bridge (not shown). A display 819 (e.g., a screen or a display monitor) is connected to the system bus 802 by a display adapter 815, which may include a graphics controller to improve the performance of graphics intensive applications and a video controller. A keyboard 821, a mouse 822, a speaker 823, etc. can be interconnected to the system bus 802 via the interface adapter 816, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 800 includes processing capability in the form of the processors 801, and, storage capability including the system memory 803 and the mass storage 810, input means such as the keyboard 821 and the mouse 822, and output capability including the speaker 823 and the display 819.

In some embodiments, the communications adapter 807 can transmit data using any suitable interface or protocol, such as the internet small computer system interface, among others. The network 812 may be a cellular network, a radio network, a wide area network (WAN), a local area network (LAN), or the Internet, among others. An external computing device may connect to the computer system 800 through the network 812. In some examples, an external computing device may be an external webserver or a cloud computing node.

It is to be understood that the block diagram of FIG. 6 is not intended to indicate that the computer system 800 is to include all of the components shown in FIG. 6. Rather, the computer system 800 can include any appropriate fewer or additional components not illustrated in FIG. 6 (e.g., additional memory components, embedded controllers, modules, additional network interfaces, etc.). Further, the embodiments described herein with respect to computer system 800 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Embodiments of the present invention can be implemented using cloud computing technology in one or more examples. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
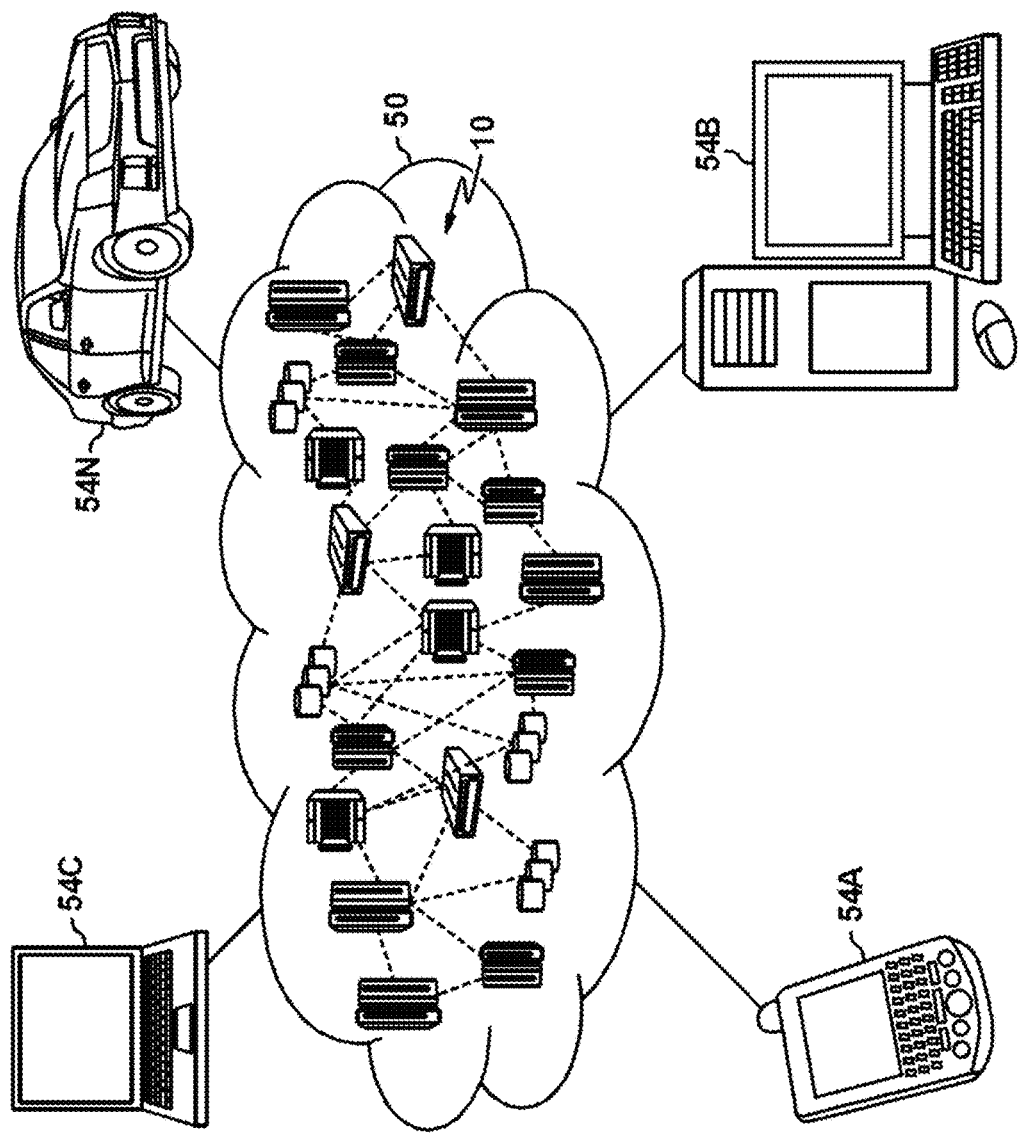
FIG. 7 depicts a cloud computing environment according to one or more embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
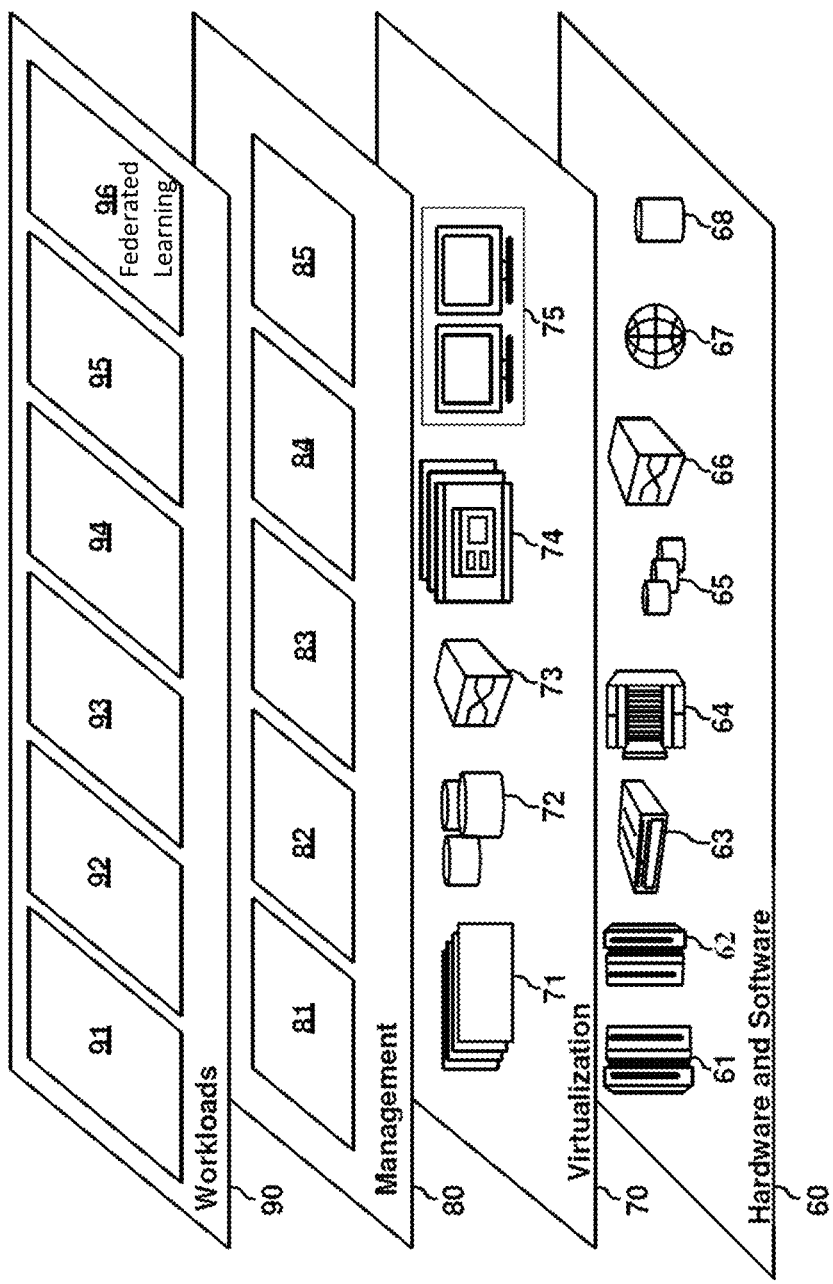
FIG. 8 depicts model layers according to one or more embodiments of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and federated learning 96.

Further, embodiments of the present invention provide a practical application by facilitating systems to provide federated learning using anonymized data, where the data is anonymized using different syntactic algorithms at respective local sites in the federated learning system. Developing federated learning models and preserving their privacy are highly relevant in and applicable to domains such as the healthcare domain. Through experimental evaluation using at least two real-world datasets and varying parameter settings, the implementation has shown that embodiments of the present invention provide high model performance, while offering an acceptable level of privacy.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

What is claimed is:

1. A computer-implemented method for federated learning, the computer-implemented method comprising:
    training a global federated learning model using an aggregator server and a plurality of local models corresponding to a plurality of local nodes respectively, wherein operations for training the global federated learning model comprise:
        training the local models at the local nodes, wherein training a first local model at a first local node comprises:
            receiving, by the first local node, a training dataset that comprises a plurality of attributes associated with a plurality of records;
            selecting, by the first local node, a set of attributes from the training dataset, the set of attributes to be used for training the first local model corresponding to said first local node;
            generating, by the first local node, an anonymized training dataset by anonymizing the training dataset using a syntactic anonymization method, which comprises:
                selecting the quasi-identifying attributes among the set of attributes to be used for training the first local model;
                generalizing the quasi-identifying attributes using a syntactic algorithm; and
                computing a first syntactic mapping based on the equivalence classes produced in the anonymized training dataset;
        sending, by the local nodes to the aggregator server, a plurality of mappings from the respective local nodes, the mappings being computed based on the equivalence classes in the anonymized training dataset from each local node;
        computing, by the aggregator server, a union of the plurality of mappings received from the local nodes; and
        training the global federated learning model by iteratively:
            training, by the local nodes, the respective local models using corresponding machine learning algorithms with respective anonymized training datasets;
            sending by the local nodes to the aggregator server, a plurality of parameter updates computed over the local models from the respective local nodes;
            computing the global federated learning model by the aggregator server, by aggregating the received plurality parameter updates computed over the local models from the respective local nodes; and
            sending aggregated parameters of the global federated learning model from the aggregator server to the local nodes.

2. The computer-implemented method of claim 1, further comprising:
    predicting, by the aggregator server, a result, in response to receiving a data sample, operations for the predicting comprising:
        converting the data sample to an anonymized data sample using the union of the plurality of mappings; and
        analyzing, the anonymized data sample using the global federated learning model to generate a prediction that is provided as the result.

3. The computer-implemented method of claim 1, wherein the syntactic algorithm is selected by the first local node for generalizing the training dataset of the first local node based on the type of data in the training dataset of the first local node.

4. The computer-implemented method of claim 3, wherein the syntactic algorithm can be one from a group of syntactic algorithms comprising k-anonymity algorithm, l-diversity algorithm, t-closeness algorithm, and $(k, k^m)$-anonymization algorithm.

5. The computer-implemented method of claim 1, wherein the set of attributes selected from the training dataset contain quasi-identifiers for the training dataset.

6. The computer-implemented method of claim 1, wherein training a first local model at a first local node comprises filtering out an attribute that is a direct identifier of a record from the training dataset.

7. The computer-implemented method of claim 1, wherein the training dataset is a first training dataset, and a second training dataset that is received at a second local node has different attributes than those in the first training dataset.

8. The computer-implemented method of claim 7, wherein the anonymized training dataset is a first anonymized training dataset, and training the global federated learning model further comprises:
    generating, by a second local node, a second anonymized training dataset corresponding to the second training dataset, which comprises:
        selecting, by the second local node, a second set of attributes from the second training dataset, the second set of attributes to be used for training a second local model corresponding to said second local node;
        selecting the quasi-identifying attributes among the second set of attributes of the second training dataset, to be used for training a second local model;
        generalizing the second set of quasi-identifying attributes using a second syntactic algorithm, distinct from that used by the first local node; and
        computing a second mapping from the equivalence classes in the second anonymized training dataset, the second mapping being distinct from the first mapping at the first local node.

9. A system comprising:
a plurality of local nodes in communication with an aggregator server, the aggregator server comprising:
a memory; and
a processor coupled with the memory, the processor programmed with machine learning algorithms and configured to perform a method for federated learning, the method comprising:
    training a global federated learning model based on a plurality of local models corresponding to a plurality of local nodes respectively, wherein operations for training the global federated learning model comprise:
        training the local models at the local nodes, wherein training a first local model at a first local node comprises:
            receiving, by the first local node, a training dataset that comprises a plurality of attributes associated with a plurality of records;
            selecting, by the first local node, a set of attributes from the training dataset, the set of attributes to be used for training the first local model corresponding to said first local node;
            generating, by the first local node, an anonymized training dataset by anonymizing the training dataset using a syntactic anonymization method, which comprises:
                selecting the quasi-identifying attributes among the set of attributes to be used for training the first local model;
                generalizing the quasi-identifying attributes using a syntactic algorithm; and
                computing a first syntactic mapping based on the equivalence classes produced in the anonymized training dataset; and
            receiving a plurality of mappings from the respective local nodes, the mappings being computed based on the equivalence classes in the anonymized training dataset from each local node;
            computing a union of the plurality of mappings received from the local nodes; and
            training the global federated learning model by iteratively:
                training, by the local nodes, the respective local models using corresponding machine learning algorithms with respective anonymized training datasets;
                receiving a plurality of parameter updates computed over the local models from the respective local nodes;
                computing the global federated learning model by aggregating the received plurality parameter updates computed over the local models from the respective local nodes; and
                sending aggregated parameters of the global federated learning model from the aggregator server to the local nodes.

10. The system of claim 9, wherein the processor is further configured to predict a result, in response to receiving a data sample, the prediction comprising:
    converting the data sample to an anonymized data sample using the union of the plurality of mappings; and
    analyzing, the anonymized data sample using the global federated learning model to generate a prediction that is provided as the result.

11. The system of claim 9, wherein the syntactic algorithm is selected for generalizing the training dataset based on type of data in the training dataset.

12. The system of claim 9, wherein the set of attributes selected from the training dataset are all quasi-identifiers for the training dataset.

13. The system of claim 9, wherein training a first local model at a first local node comprises filtering out an attribute that is a direct identifier of a record from the training dataset.

14. The system of claim 9, wherein the training dataset is a first training dataset, and a second training dataset that is received at a second local node has different attributes than those in the first training dataset.

15. The system of claim 14, wherein the anonymized training dataset is a first anonymized training dataset, and training the global federated learning model further comprises:
    generating, by a second local node, a second anonymized training dataset corresponding to the second training dataset, which comprises:
        selecting, by the second local node, a second set of attributes from the second training dataset, the second set of attributes to be used for training a second local model corresponding to said second local node;
        selecting the quasi-identifying attributes among the second set of attributes of the second training dataset, to be used for training a second local model;
        generalizing the second set of quasi-identifying attributes using a second syntactic algorithm, distinct from that used by the first local node; and
        computing a second mapping from the equivalence classes in the second anonymized training dataset, the second mapping being distinct from the first mapping at the first local node.

16. A computer program product comprising a memory storage device having computer executable instructions stored thereon, the computer executable instructions when executed by a processing unit of an aggregator server cause the processing unit to perform a method comprising:
    training, by the aggregator server, a global federated learning model based on a plurality of local models corresponding to a plurality of local nodes respectively, wherein operations for training the global federated learning model comprise:
        training the local models at the local nodes, wherein training a first local model at a first local node comprises:

receiving, by the first local node, a training dataset that comprises a plurality of attributes associated with a plurality of records;

selecting, by the first local node, a set of attributes from the training dataset, the set of attributes to be used for training the first local model corresponding to said first local node;

generating, by the first local node, an anonymized training dataset by anonymizing the training dataset using a syntactic anonymization method, which comprises:

selecting the quasi-identifying attributes among the set of attributes to be used for training the first local model;

generalizing quasi-identifying attributes using a syntactic algorithm; and computing a first syntactic mapping based on the equivalence classes produced in the anonymized training dataset;

receiving, by the aggregator server, a plurality of mappings from the respective local nodes, the mappings being computed based on the equivalence classes in the anonymized training dataset from each local node;

computing, by the aggregator server, a union of the plurality of mappings received from the local nodes; and training the global federated learning model by iteratively:

training, by the set of local nodes, the respective local models using corresponding machine learning algorithms with respective anonymized training dataset;

receiving, by the aggregator server, a plurality of parameters computed over the local models from the respective local nodes;

computing the global federated learning model by aggregating the received plurality parameter updates computed over the local models from the respective local nodes; and sending aggregated parameters of the global federated learning model from the aggregator server to the local nodes.

17. The computer program product of claim 16, where in the method further comprises:

predicting, by the aggregator server, a result, in response to receiving a data sample, operations for the predicting comprising:

converting the data sample to an anonymized data sample using the union of the plurality of mappings; and analyzing, the anonymized data sample using the global federated learning model to generate a prediction that is provided as the result.

18. The computer program product of claim 16, wherein the syntactic algorithm is selected for generalizing the training dataset based on type of data in the training dataset.

19. The computer program product of claim 15, wherein the training dataset is a first training dataset, and a second training dataset that is received at a second local node has different attributes than those in the first training dataset.

20. The computer program product of claim 19, wherein the anonymized training dataset is a first anonymized training dataset, and training the global federated learning model further comprises:

generating, by a second local node, a second anonymized training dataset corresponding to the second training dataset, which comprises:

selecting, by the second local node, a second set of attributes from the second training dataset, the second set of attributes to be used for training a second local model corresponding to said second local node;

selecting the quasi-identifying attributes among the second set of attributes of the second training dataset, to be used for training a second local model;

generalizing the second set of quasi-identifying attributes using a second syntactic algorithm, distinct from that used by the first local node; and computing a second mapping from the equivalence classes in the second anonymized training dataset, the second mapping being distinct from the first mapping at the first local node.

* * * * *